No. 753,785. PATENTED MAR. 1, 1904.
J. ARCHER.
VARIABLE GEARING FOR VELOCIPEDES OR ROAD MOTOR VEHICLES.
APPLICATION FILED FEB. 25, 1902.
NO MODEL. 4 SHEETS—SHEET 1.

WITNESSES:
Isabella Waldron
Adelaide Claire Gleason

INVENTOR
James Archer
BY Richards & Co.
ATTORNEYS

THE NORRIS PETERS CO., PHOTO-LITHO., WASHINGTON, D. C.

No. 753,785. PATENTED MAR. 1, 1904.
J. ARCHER.
VARIABLE GEARING FOR VELOCIPEDES OR ROAD MOTOR VEHICLES.
APPLICATION FILED FEB. 25, 1902.
NO MODEL. 4 SHEETS—SHEET 2.
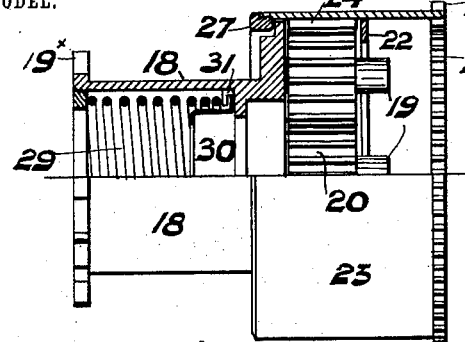
FIG. 4.
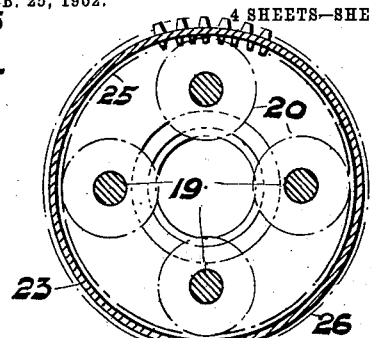
FIG. 5.
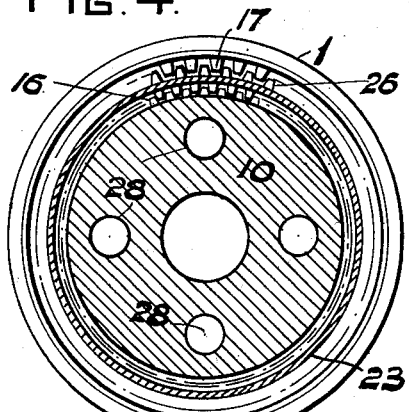
FIG. 6.
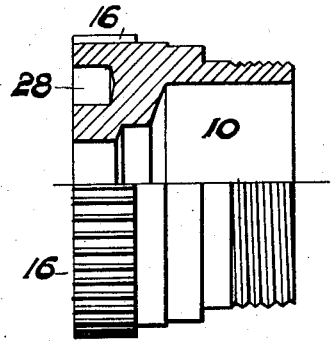
FIG. 7.
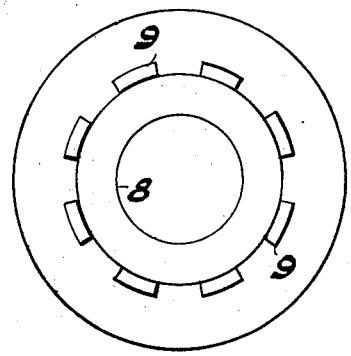
FIG. 8. FIG. 9.
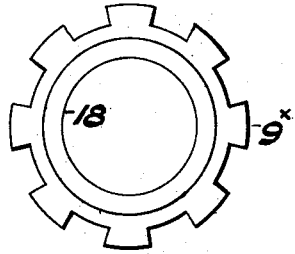
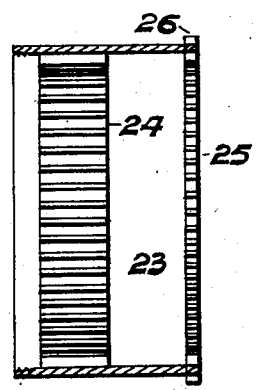
FIG. 10.
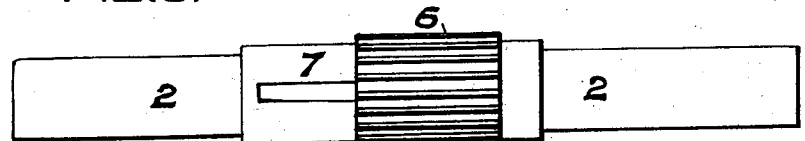
FIG. 11.
WITNESSES:
Isabella Waldron
Adelaide Claire Gleason
INVENTOR.
James Archer
BY Richards & Co
ATTORNEYS No. 753,785. PATENTED MAR. 1, 1904.
J. ARCHER.
VARIABLE GEARING FOR VELOCIPEDES OR ROAD MOTOR VEHICLES.
APPLICATION FILED FEB. 25, 1902.
NO MODEL. 4 SHEETS—SHEET 3.

WITNESSES:
Isabella Waldron
Adelaide Claire Gleason

INVENTOR
James Archer
BY Richards & Co
ATTORNEYS

THE NORRIS PETERS CO., PHOTO-LITHO., WASHINGTON, D. C.

No. 753,785. PATENTED MAR. 1, 1904.
J. ARCHER.
VARIABLE GEARING FOR VELOCIPEDES OR ROAD MOTOR VEHICLES.
APPLICATION FILED FEB. 25, 1902.
NO MODEL. 4 SHEETS—SHEET 4.

WITNESSES:
Isabella Waldron
Adelaide Claire Gleason

INVENTOR.
James Archer
BY Richards & Co
ATTORNEYS.

No. 753,785. Patented March 1, 1904.

UNITED STATES PATENT OFFICE.

JAMES ARCHER, OF MANCHESTER, ENGLAND, ASSIGNOR TO THE THREE-SPEED GEAR SYNDICATE, LTD., OF LENTON, NOTTINGHAM, ENGLAND.

VARIABLE GEARING FOR VELOCIPEDES OR ROAD MOTOR-VEHICLES.

SPECIFICATION forming part of Letters Patent No. 753,785, dated March 1, 1904.

Application filed February 25, 1902. Serial No. 95,512. (No model.)

*To all whom it may concern:*

Be it known that I, JAMES ARCHER, a subject of the King of Great Britain and Ireland, and a resident of Hulme, Manchester, England, have invented certain new and useful Improvements in Variable Gearing for Velocipedes or Road Motor-Vehicles, of which the following is a specification.

This invention relates to the driving-gear of velocipedes and road motor-vehicles; and its object is to provide mechanism by which the rider may have the option of using any one of three different gears, representing, say, "high," "normal," and "low" speeds, and for each or certain of such gears to drive the object to be driven backward or forward and constitute what is hereinafter called a "fixed" gear or drive the object to be driven in a forward direction only and constitute what is hereinafter termed a "free-wheel" gear.

The further object is so to construct the parts that the high and low gear mechanism may be applied or removed without affecting the normal gear.

Figure 1:
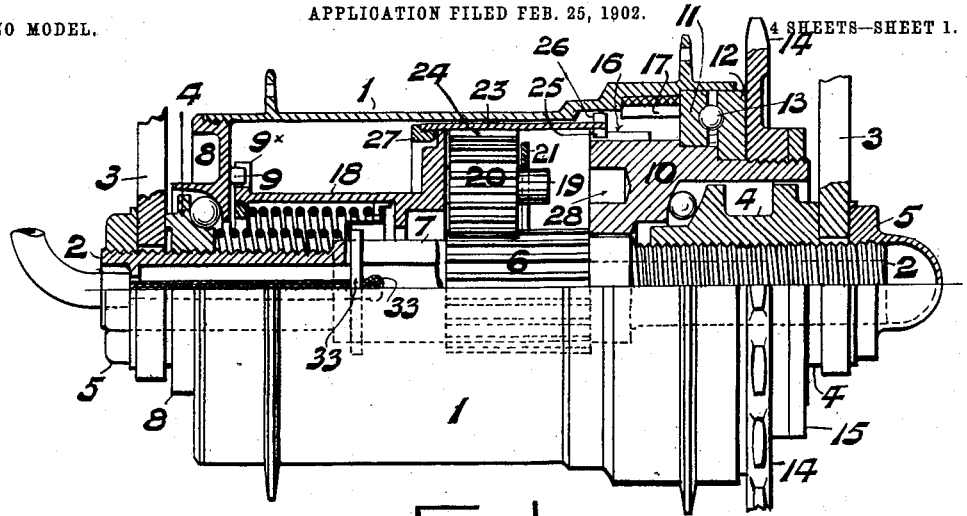
Figure 2:
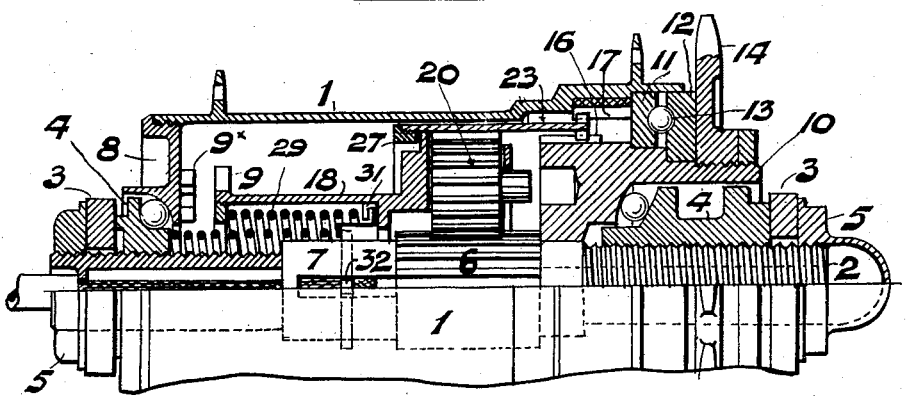
Figure 3:
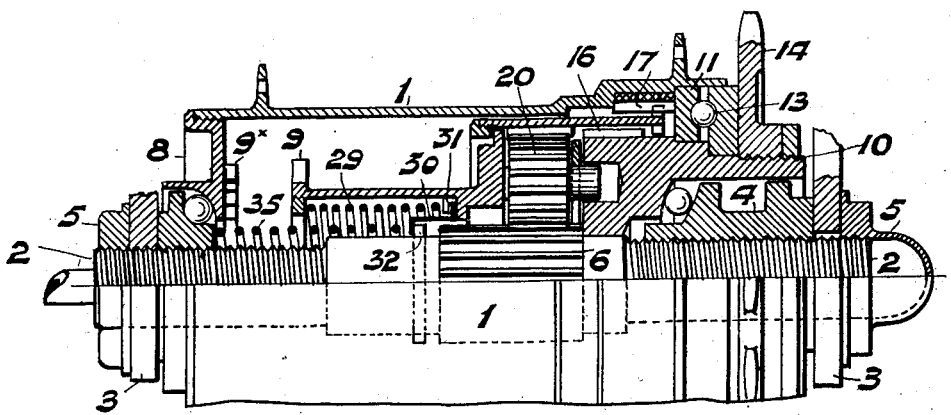
Figure 12:
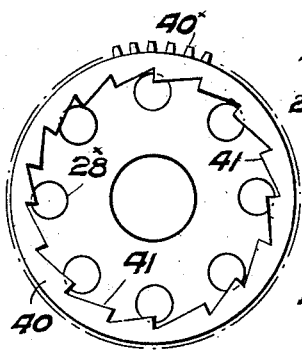
Figure 15:
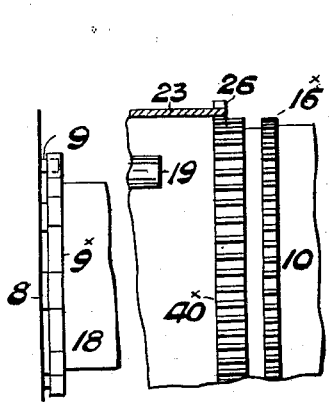
Figure 16:
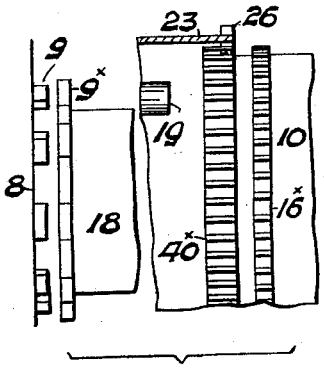
Figure 17:
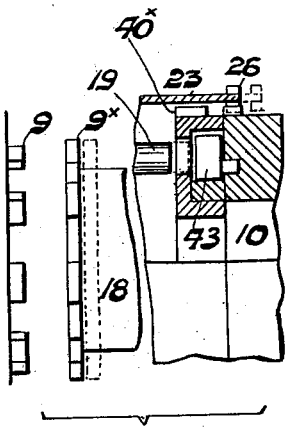
Figure 18:
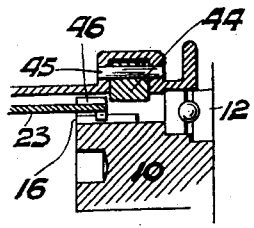
Figure 19:
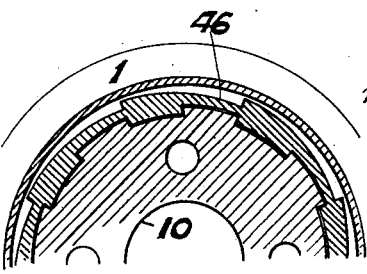
Figure 20:
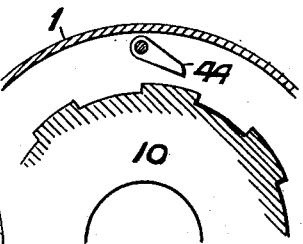
Figures 21, 22:
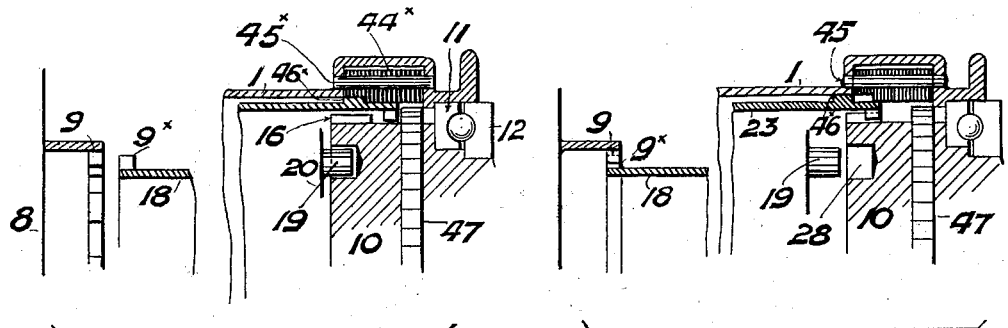
Figures 23, 24:
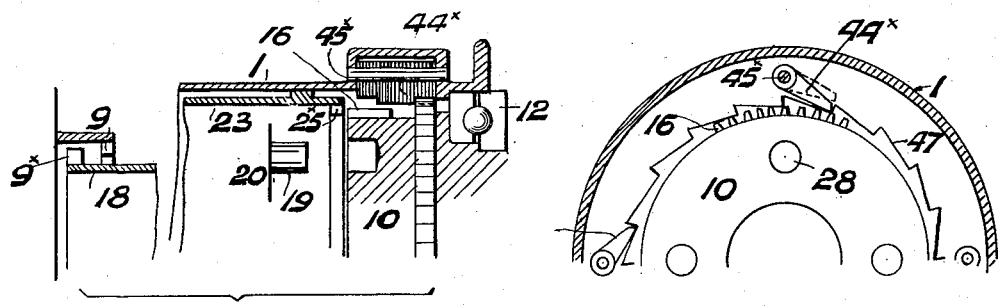
Figure 25:
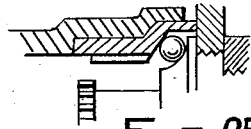

On Sheet 1 of the accompanying drawings, Figure 1 illustrates a longitudinal elevation, partly sectional, of a wheel-hub fitted with my invention and as adapted for giving three gears—high, normal, and low—and all the gears fixed. Such view also shows the position of the parts for giving the low speed. Figs. 2 and 3 illustrate like views; but Fig. 2 shows a plan and the position of the parts for giving the normal speed, and Fig. 3 shows the position of the parts for giving the high speed. On Sheet 2, Fig. 4 illustrates a longitudinal section, and Fig. 5 a transverse section on line $a\,b$, of important parts of the invention and hereinafter called the "planet-cage" and "gear-ring." Fig. 6 illustrates a transverse section of Fig. 2 on line $c\,d$. Fig. 7 illustrates a longitudinal section of the part which constitutes the "driver." Fig. 8 illustrates the side view of the hub-bush or cup-bearing shown at the left hand of Fig. 1 and part of the low gear, and Fig. 9 illustrates a side view at the left-hand end of the planet-cage and another part of the low gear. Fig. 10 illustrates a sectional view of the gear-ring alone, and Fig. 11 illustrates a detached view of the wheel-axle. On Sheet 3, Fig. 12 illustrates a side view, Fig. 13 a longitudinal section, and Fig. 14 another side view, of certain parts of the improved gear as adapted to give the free-wheel effect on any of the gears, Fig. 15 illustrating the position of the parts for giving the free-wheel effect with the low gear, Fig. 16 illustrating the position of the parts for giving the free-wheel effect with the normal gear, and Fig. 17 illustrating by full lines the position of the parts for giving fixed gear with the normal and by dotted lines the position of the parts for giving the free-wheel effect with the high gear. Fig. 18 illustrates a longitudinal section of a modified construction of hub and shows the use of pawls in the hub and ratchet-teeth on the gear-ring for giving the free-wheel effect on the normal and high gears only, the low gear being fixed. Figs. 19 and 20 illustrate transverse sections on lines $e\,f$ and $g\,h$ respectively. On Sheet 4 Figs. 21, 22, and 23 illustrate longitudinal sections of a further application of pawls in the hub, but with the ratchet-teeth on the driver and showing the three positions for obtaining the three speeds—low, normal, and high—and the free-wheel effect of the normal and high gears only, the low gear being fixed. Fig. 24 illustrates a transverse section of Fig. 23 on line $i\,j$. Fig. 25 illustrates a modified detail of Fig. 1.

According to the invention and referring to Figs. 1 to 11, 1 is the hub of, say, the rear wheel of a safety-bicycle, more or less of ordinary construction. Within such hub is a hollow axle 2, held stationary relatively to the hub by the usual forks or members 3 of the bicycle-frame, the ball-bearings 4, and nuts 5. Upon or formed in such axle is a fixed ring of gear-teeth, constituting a fixed pinion 6, and in a plane portion of such axle is a slot 7. In one end of the hub and supporting the hub at that end concentric to the axle is the bush or cup-bearing 8, and upon the inner face of such bush is one-half of a clutch, represented in the drawings, for example, by a ring of segmental teeth 9. At the other end of the hub and supporting the hub concentric with the axle at that end is a ball-bearing 4 aforesaid, a sleeve or bush 10, hereinafter and previously called the "driver," (see Fig. 2,) and a pair of ball-race rings 11 12, with antifriction-balls 13 between them. Upon the driver is the usual chain or sprocket wheel 14, held tightly thereon and against the ring 12 by the clamping-nut 15. Upon the periphery of the driver within the hub is a ring of clutch-teeth 16, and upon the interior of the hub is a ring of clutch-teeth 17. Within the hub and surrounding the axle is the planet-cage, comprising a tubular part 18, carrying studs 19, and pinions 20, loosely mounted on the said studs and held thereon by a wedge-ring 21 or a flange 22. (See Fig. 4.) The pinions 20 mesh at all times with the pinion 6 on the axle. Upon the tubular part 18 is also the half portion $9^\times$ of the low-gear clutch.

Identified with the planet-cage is the gear-ring 23, (see Fig. 10,) having an internal ring of spur-gear teeth 24, with which pinions 20 always mesh, as shown. Upon such gear-ring is also an internal ring of clutch-teeth 25 and an external ring of clutch-teeth 26. The said gear-ring 23 and tubular part 18, although joined or coupled by a ring 27, are free to rotate independently of each other.

In the driver 10 is a series of holes 28, corresponding in spacing from each other and in the distance from the axle 2 with the spacing and distance of the studs 19, and these latter are of such a length and size as to fit into the said holes, as shown in Fig. 3.

With the planet-cage in the position shown in Fig. 1 the hub is driven at the low speed, the driving taking place through the clutch-teeth 16 and 25, the gear-ring 23, the pinions 20, studs 9, tubular part 18, and the clutch-teeth 9 and $9^\times$, the pinion 6 offering the necessary resistance to cause the pinions 20 to rotate on their studs 19 as they are rolled around the axle by the teeth 24, and thus reduce the speed.

With the planet-cage in the position shown in Fig. 2 the hub is driven at the normal speed, the driving taking place direct through the clutch-teeth 16, 25, 26, and 17 and the planet-cage rotating idly round the axle.

With the planet-cage in the position shown in Fig. 3 the hub is driven at high speed, the driving taking place through the studs 19, pinions 20, gear-ring 23, and the clutch-teeth 26 and 17.

The means for bringing about the lateral movements of the planet-cage and gear-ring may vary; but in practice I have found the device shown in Figs. 1, 2, and 3 satisfactory. Within the tubular part 18 I insert a spiral spring 29; also a thimble-like part 30, with contact-ring 31, and in the slot 7 of the axle I insert a cross pin or bar 32, the ends of which project on each side of the axle and normally lie behind the flange end of the thimble-like part 30, as shown. Around the axle 2 within the spring 29 I place a further spring 35. Under the full elongation of this spring the position of the parts is as shown in Fig. 3. To obtain the normal gear, the cord or chain is pulled and the bar 32 thereby caused to press against the thimble-like part 30 and through the spring 35 move the planet-cage to the position shown in Fig. 2, the spring 35 being thereby slightly compressed. To obtain low gear, the cord or chain is given a further pull, thereby causing the bar 32 to move the planet-cage to the position shown in Fig. 1, the spring 35 being thereby still further compressed. Should the clutches not be relatively opposite, the spring 29 is slightly compressed—say as shown in Fig. 1—so that immediately the gears rotate the clutches engage under the elongation of the spring 29. Upon the cord or chain being relaxed the spring 35 then serves to change the gears by its elongation.

The arrangements so far as I have described them are all fixed gears. To obtain a free-wheel effect with some or all of the gears, I employ the devices shown in Figs. 12, 13, and 14, or Figs. 18, 19, and 20, or Fig. 21, or I employ an ordinary free wheel applied to the driver 10.

Figure 13:
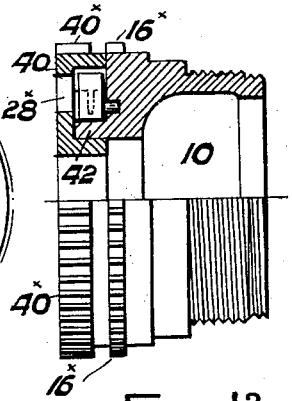
Figure 14:
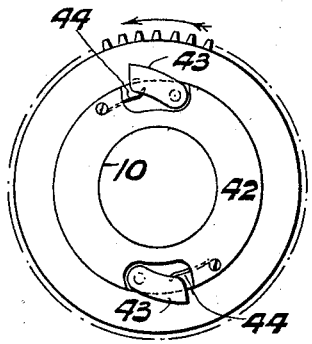

Referring to Figs. 12, 13, and 14, I provide special clutch-disk 40, having holes $28^\times$, clutch-teeth $40^\times$, an internal ring of ratchet-teeth 41 and adapted to surround a boss 42 on the driver 10, having cavities in which I fit small pawls 43. With the planet-cage and gear-ring in the position shown in Fig. 15 for the low gear the driving is through the pawls 43, (which engage the teeth 41 by centrifugal force and the springs 44,) through clutch-disk 40, and clutch-teeth $40^\times$ and 25, and is therefore in one direction only, the teeth 41 slipping over the pawls when the motion of the driver is retarded.

When the planet-cage and gear-ring are in the position shown in Fig. 16 for the normal gear, the driving is through the pawls 43, clutch-disk 40, clutch-teeth $40^\times$, 25, 26, and 17, and is thus again in one direction only.

When the planet-cage and gear-ring are in the position shown in full lines in Fig. 17, the driving takes place through the clutch-teeth $16^\times$, 25, 26, and 17, and is therefore normally fixed; but when the planet-cage and gear-ring are moved to the position shown by dotted lines in Fig. 17 for the high gear the driving is through the pawls 43, disk 40, studs 19, pinions 20, teeth 24, 26, and 17, and is therefore in one direction only. With this arrangement I get a free-wheel low gear, a free-wheel normal gear, a fixed normal gear, and a free-wheel high gear.

Referring to Figs. 18, 19, 20, I substitute for the clutch-teeth 17 (shown in Fig. 1) a series of pawls 44, mounted loosely on pins 45, fixed in the hub, and in place of the gear-teeth 26 on the gear-rings 23 I substitute ratchet-teeth 46. With this arrangement it will be seen that for the low speed the gear will be fixed, but that for the normal and high the gears will be free in one direction and that in the case of the normal speed will take place through the teeth 16 25, ratchet-teeth 46, and the pawls 44, the pawls slipping over the teeth 46 when the motion of the driver is retarded. For the high speed it will also be seen that the driving will take place in one direction only and through studs 19, pinions 20, teeth 46, and pawls 44, the teeth 16 and 25 being of course out of gear.

Referring to Figs. 21, 22, 23, and 24, I provide the driver 10 with ratchet-teeth 47 and clutch-teeth 16, also the gear-ring with ratchet-teeth 46 and clutch-teeth 25. I also provide pawls 44$^\times$, mounted on pins 45$^\times$ in the hub, and for the high gear the position of the parts is as shown in Fig. 20, the pawls engaging the ratchet-teeth 46$^\times$, but held clear of the ratchet-teeth 47 and the driving taking place through the studs 19, pinions 20, ratchet-teeth 46, and pawls 44$^\times$, and therefore being in one direction only.

For the low gear the position of the parts is as shown in Fig. 22, the pawls being held clear of ratchet-teeth 47 by resting on the plane end of the gear-ring, as shown, and the driving taking place through the clutch-teeth 16 25$^\times$ and clutch-teeth 9 and 9$^\times$ and the driving therefore being fixed.

For the normal gear the position of the parts is as shown in Fig. 23, the pawls being allowed to mesh under the force of the springs with the ratchet-teeth 47 and the driving taking place through such pawls and teeth, and therefore being in one direction only, the mechanism for the high and low gears being for the time being entirely disengaged with the driver or hub.

In all the foregoing arrangements it will be seen that the main idea is the introduction of pawls and ratchet-teeth at any suitable point in the train of gearing and that other combinations may suggest themselves to arrive at the same end without departing from my invention.

In Fig. 25 I show how I may dispense with the rings 11 12 (shown in Fig. 1) by forming a race on the end of the clutch-ring 17 and on the driver.

While chiefly for velocipede use, my invention applies equally to road motor-vehicles, and from a perusal of the drawings it will be seen in the case of Figs. 21 to 24 that by removing the planet-cage and gear-ring pawls 44$^\times$ and ratchet-teeth 47 will still give the normal gear, also that the internal parts are all readily accessible for examination and repair.

What I claim is—

1. In variable gearing for velocipedes and road motor-vehicles, a hub, having an inner clutch-ring; a "driver" having clutch-teeth, also holes or notches at one end; a gear-ring also having clutch-teeth adapted to engage the clutch-teeth on the driver and hub, and said gear-ring also having an inner internal ring of gear-teeth, a "planet-cage" comprising a tubular part, and a series of studs and pinions, means for loosely coupling said cage and gear-ring; clutch-teeth on the said tubular part; a cup-bearing for the said hub; clutch-teeth on the said cup-bearing; a fixed central axle for the hub; a fixed pinion on the said axle, with which, and the said gear-ring, the pinions of the planet-cage gear, and means for moving the planet-cage and gear-ring to and fro within the hub, substantially as set forth.

2. In combination, a stationary axle, a rigid gear carried thereby, a hub rotatably mounted on the axle, a driver also rotatably mounted on the axle, a planet-cage rotatable around said axle, planet-gears rotatably carried by said cage and meshing with said rigid gear, a gear-ring encircling and meshing with said planet-gears, clutch mechanism for connecting and disconnecting the gear-ring and driver, and clutch mechanism for connecting and disconnecting the planet-cage and the driver, said gear-ring having means of connection with the hub, substantially as described.

3. In combination, a stationary axle, a rigid gear carried thereby, a hub rotatably mounted on the axle, a driver also rotatably mounted on the axle, a planet-cage rotatable around said axle, planet-gears rotatably carried by said cage and meshing with said rigid gear, a gear-ring encircling and meshing with said planet-gears, clutch mechanism for connecting and disconnecting the gear-ring and hub, means whereby the gear-ring may be connected and disconnected from the driver, and means whereby the cage may be connected with and disconnected from the driver, substantially as described.

4. In combination, a stationary axle having an elongated rigid gear, a longitudinally-movable planet-cage rotatably mounted on said axle, planet-gears carried by said cage and meshing with said rigid gear, a gear-ring movable with said cage and engaging said planet-gears, a hub, clutch mechanism rendered effective by the movement of said cage for connecting it with and disconnecting it from the hub, clutch mechanism operated by the movement of said ring for connecting and disconnecting said ring with the driver and also with the hub, and means whereby also on movement of said cage it may be connected with and disconnected from the driver, substantially as described.

In witness whereof I have hereunto set my hand in the presence of two witnesses.

JAMES ARCHER.

Witnesses:
 WALTER GROWN,
 JOHN CAMP.